US012083425B2

(12) United States Patent
Edridge et al.

(10) Patent No.: US 12,083,425 B2
(45) Date of Patent: Sep. 10, 2024

(54) APPARATUS AND METHOD OF USER ANALYSIS AND CONTENT SELECTION

(71) Applicant: Sony Interactive Entertainment Europe Limited, London (GB)

(72) Inventors: Paul Edridge, London (GB); Andrew John Nicholas Jones, London (GB); Hugh Alexander Dinsdale Spencer, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 17/201,682

(22) Filed: Mar. 15, 2021

(65) Prior Publication Data

US 2021/0291051 A1 Sep. 23, 2021

(30) Foreign Application Priority Data

Mar. 17, 2020 (GB) .................................... 2003842

(51) Int. Cl.
*A63F 9/24* (2006.01)
*A63F 13/44* (2014.01)
*A63F 13/45* (2014.01)
*A63F 13/79* (2014.01)

(52) U.S. Cl.
CPC .............. *A63F 13/44* (2014.09); *A63F 13/45* (2014.09); *A63F 13/79* (2014.09); *A63F 2300/63* (2013.01)

(58) Field of Classification Search
CPC ........ A63F 13/795; A63F 13/79; A63F 13/69; A63F 13/847; A63F 13/44
See application file for complete search history.

(56) References Cited

U.S. PATENT DOCUMENTS

| | | | | |
|---|---|---|---|---|
| 2011/0184771 A1* | 7/2011 | Wells | ............. | G06Q 10/063114 705/7.14 |
| 2011/0252248 A1* | 10/2011 | Cameron | ............... | G06Q 50/06 713/300 |
| 2011/0302508 A1* | 12/2011 | Harp | ....................... | A63F 13/46 715/753 |
| 2012/0157212 A1* | 6/2012 | Kane | ..................... | G06F 3/0482 463/42 |

(Continued)

OTHER PUBLICATIONS

Combined Search Report and Abbreviated Examination Report for Application No. GB2003842.8, dated Jul. 30, 2020, 9 pages.

(Continued)

*Primary Examiner* — David L Lewis
*Assistant Examiner* — Eric M Thomas
(74) *Attorney, Agent, or Firm* — Lerner David LLP

(57) ABSTRACT

A method of estimating a time to complete a task for a user of a computer comprises: identifying a target task for which a time is to be estimated for completing the task, determining as a start point the completion of the last task completed by the user on the computer, obtaining, from data relating to a corpus of users, data for at least a subset of those users who completed the last task completed by the user before also completing the target task wherein the obtained data comprises timing data, calculating a representative time from the start point to the completion of the target task, based upon the obtained data, and implementing a predetermined action responsive to the calculated representative time.

15 Claims, 11 Drawing Sheets

(56) References Cited

U.S. PATENT DOCUMENTS

2012/0220373 A1* 8/2012 Cantor .................. A63F 13/533
463/40
2014/0316597 A1* 10/2014 Ofek ...................... G06Q 50/06
700/291
2017/0326454 A1* 11/2017 Cantor .................. A63F 13/533

OTHER PUBLICATIONS

Sony Interactive Entertainment Europe Limited, GB Application No. 1915423.6, filed on Oct. 24, 2019, titled "Apparatus and Method of User Analysis and Content Selection", 35 pages.

* cited by examiner

| MK 1 | MF 01 | MF 02 | MF 03 | MF 04 | MF 05 | MF 06 | MF 07 | MF 08 | MF 09 | MF 10 |
|---|---|---|---|---|---|---|---|---|---|---|
| MF 01 |  | 123,984 | 50,502 | 8,834 | 2,429 | 27,270 | 1,247 | 3,838 | 1,928 | 1,434 |
| MF 02 | 103,618 |  | 66,412 | 33,235 | 9,762 | 14,241 | 4,619 | 7,086 | 10,363 | 7,423 |
| MF 03 | 43,670 | 43,384 |  | 38,060 | 5,276 | 108,616 | 2,144 | 1,991 | 3,150 | 2,011 |
| MF 04 | 8,676 | 23,605 | 23,008 |  | 73,125 | 13,246 | 19,760 | 9,073 | 11,328 | 6,319 |
| MF 05 | 3,136 | 7,057 | 3,775 | 23,054 |  | 3,140 | 210,653 | 13,681 | 7,419 | 3,920 |
| MF 06 | 7,434 | 1,445 | 10,095 | 3,141 | 405 |  | 217 | 628 | 333 | 162 |
| MF 07 | 2,933 | 6,720 | 3,327 | 15,923 | 164,995 | 2,382 |  | 31,445 | 11,419 | 6,002 |
| MF 08 | 2,474 | 4,594 | 1,375 | 4,964 | 7,032 | 3,261 | 10,632 |  | 12,256 | 6,025 |
| MF 09 | 1,503 | 4,818 | 1,960 | 4,396 | 3,760 | 1,441 | 2,273 | 3,418 |  | 242,733 |
| MF 10 | 1,496 | 4,224 | 1,457 | 2,648 | 2,571 | 1,004 | 1,570 | 3,084 | 67,623 |  |

FIG. 7

APPARATUS AND METHOD OF USER ANALYSIS AND CONTENT SELECTION

CROSS-REFERENCE TO RELATED APPLICATION

The present application claims priority from United Kingdom Patent Application No. 2003842.8, filed on Mar. 17, 2020, the disclosure of which is hereby incorporated herein by reference.

BACKGROUND OF THE INVENTION

Field of the Invention

The present invention relates to an apparatus and method of user analysis and content selection.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Video games are played by people across all demographics, and consequently are played by people with many different lifestyles. For example, some people may be able to devote an entire day to playing a game, whilst others may sometimes only be able to fit in a short period of time in which to play.

Nevertheless, people with limited available time will still wish to have a fulfilling gaming experience, across a broad range of games.

The present invention aims to address or mitigate this problem.

SUMMARY OF THE INVENTION

In a first aspect, a method of estimating a time to complete a task for a user of a computer is provided in accordance with claim 1.

In another aspect, an apparatus adapted to estimate a time to complete a task for a user of a computer is provided in accordance with claim 12.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a table listing numbers of users who progressed between respective tasks in accordance with embodiments of the present description.

DESCRIPTION OF THE EMBODIMENTS

An apparatus and method of user analysis and content selection are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

An apparatus implementing a method of user analysis and content selection may take the form of a user's videogame console device for hosting playable videogames, a server operable to communicate with such a user's videogame console via a network, or a combination of the two.

Hence for the purposes of explanation a videogame activity search apparatus may take the form of a Sony® PlayStation 4 ® or PlayStation 5 ® entertainment device, operating under suitable software instruction.

Figure 1:
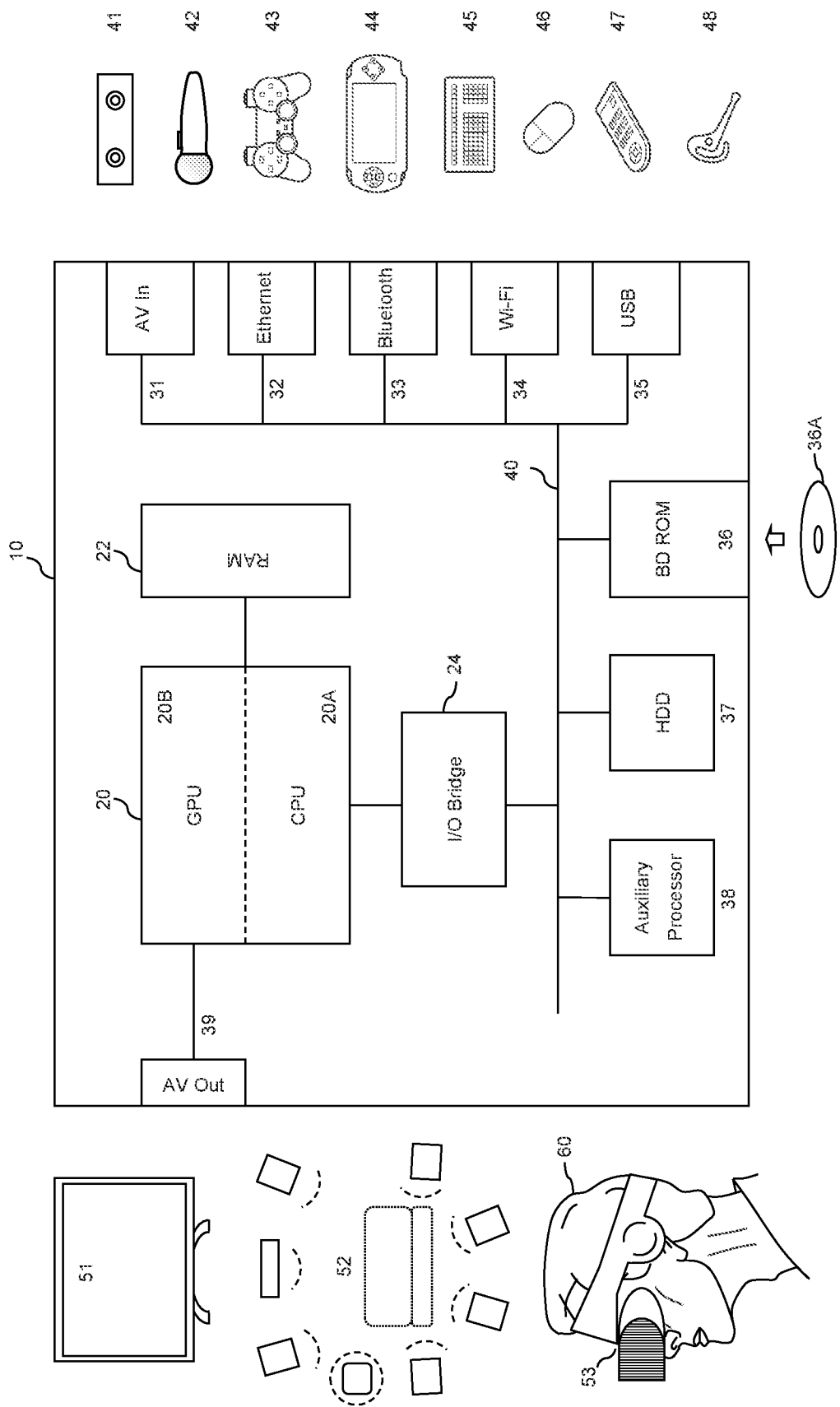
FIG. 1 is a schematic diagram of an entertainment device in accordance with embodiments of the present description.

Referring now to the drawings, wherein like reference numerals designate identical or corresponding parts throughout the several views, FIG. 1 schematically illustrates the overall system architecture of the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation Eye®;

wand-style videogame controllers 42 such as the PlayStation Move® and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD® 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 2:
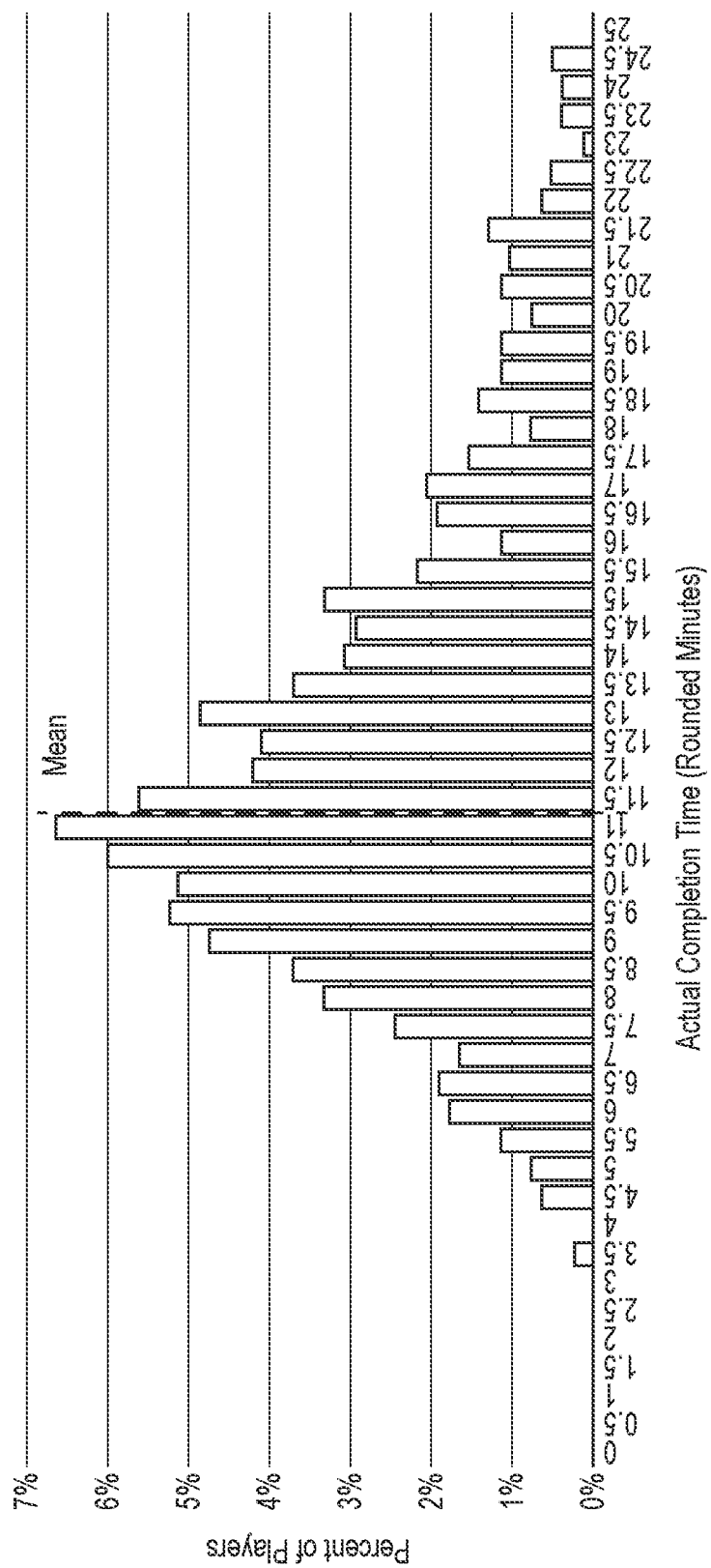
FIG. 2 is a graph showing a distribution of task completion times in accordance with embodiments of the present description.

Referring now to FIG. 2, embodiments of the present description relate to estimating how long a player would take to complete a given task (i.e., game objective) within a game. This is useful in enabling a player to judge what task might best fit into their schedule, or to promote or select a suitably timed task for a user who has stated that they want to play for a specific period, or to promote or select a suitably timed task for a user who has a time limit imposed on their play (for example due to parental controls). In the following, the terms task, subtasks, quests, sub-quests, events, and any similar in-game action with a measurable completion or increment toward completion may be referred to as a 'task' herein, unless specifically differentiated.

FIG. 2 shows a distribution of completion times of a corpus of users who have completed a particular task in an example game (in this case Horizon Zero Dawn®). The completion times are in-game elapsed time, rather than absolute time, and so may for example span several game sessions over several days, whilst only adding up to (for example) 25 minutes of in-game elapsed time. The data may be gathered from users by reporting game telemetry from the client devices to a server.

It can be seen in FIG. 2 that there is a wide distribution of times. Consequently, if simply the mean completion time (10 mins 54 secs) of this corpus is obtained, there will be a lot of players for whom the mean is not an accurate estimation of their individual completion time; the mean average error in this case (i.e., the average of the error size for each member of the corpus, whether too short or too long) is 6 minutes 13 seconds. This is of similar magnitude to the original estimate, making that estimate poor.

Clearly therefore the average time for a corpus of all players who have completed a task can be a poor predictor of play duration for that task for any given individual player, particularly if the actual distribution of completion times is broad. Hence if attempting to give a current player a predicted estimate of how long it will take them to complete the task, then using a basic average of the time taken by such a corpus of players is relatively poor.

To improve this estimate, it is possible to characterise the relative speed or proficiency of players within the corpus, for example based on their relative speed compared to others within the corpus for a previous N tasks, to identify sub-groups within the corpus of users according to completion speed; the current's user's speed/proficiency (i.e., capability) may then be similarly estimated to determine which sub-group of members of the corpus the user is most similar to; a peer subgroup. The prediction for the current user for a given task can then be based on the average completion time (or any suitable estimation scheme) for that task for that determined peer sub-group. The resulting prediction is considerably more accurate that taking the mean of a global corpus. A technique for achieving this is disclosed in GB application 1915423.6, the contents of which are incorporated herein by reference.

However, alternatively or in addition to the above referenced technique, estimates of task completion times can be improved further than the basic average of FIG. 2 by other considerations.

Figure 3:
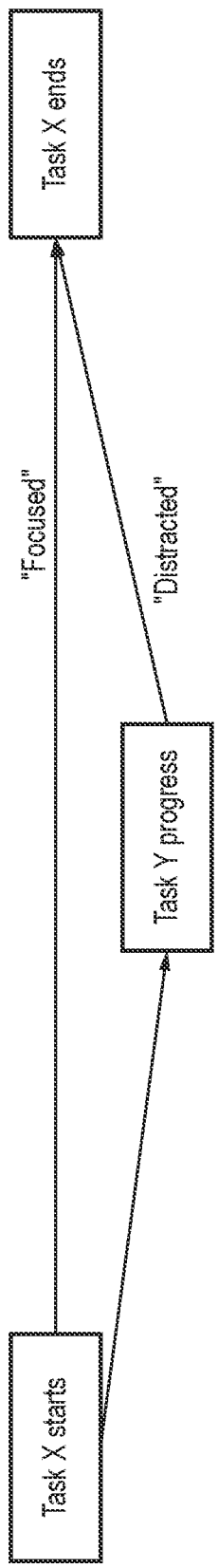
FIG. 3 is a schematic diagram of focused and distracted approaches to task completion in accordance with embodiments of the present description.

Accordingly, and referring now to FIG. 3, it will be appreciated that in complex games, for example such as so-called 'open world' games, the user typically self-directs their actions. In particular, they are free to switch between tasks, for example opportunistically exploring a cave found whilst travelling through the game to a previously intended destination relating to a different task.

Hence the degree to which a user remains focused on a current task or gets side-tracked is also a significant indicator of the time taken to complete a given task; it will be appreciated, with reference to FIG. 3, that a more 'focused' (i.e., undeviating) approach will likely be quicker than a more 'distracted' approach where other activities or partial activities are also completed.

It will also be appreciated that in a complex, open world game, it may be difficult to predict how distracted a user will become between the start of Task X and the end of Task X.

Hence rather than necessarily estimate the time taken to progress from the start of one task to the completion of that task, rather the time taken between successive events (completions of tasks) can be measured to build up a web of links from one current state to another.

For a given pair of completed tasks, it is possible to identify a sub-group of the corpus of users who took the fastest path (in terms of accumulated activities) from the current user's current state to the end of a task, assuming no further distractions. This may be considered the most optimistic (shortest) completion estimate. This corpus can then provide an optimistic or fully focused predicted time for completion of the task based on the average (or any suitable estimation scheme) for that sub-group of users within the corpus that took this fastest path. The time taken also provides an estimate for the duration of that link in a chain of tasks, if needed.

Meanwhile it is also possible to predict a most common path from the current user's current state to the completion of a task, even if this comprises the completion of other tasks enroute; however, for a complex game, there may be many hundreds or thousands of paths, and so the most 'common' individual path may nevertheless still only represent a couple of percent of players in the corpus and be unlikely to coincide with the player's actions.

Hence to create a corpus that is likely to represent a realistic set of common options, then for example 25% of the corpus (or any other percentage, such as 5, 10, 15, 20, 30, 40, 50, 75, 90) may be cumulatively selected based upon an accumulation of the most common routes. Here, this may mean choosing the most common path, then the next most common, and so on, until N % (e.g., 25%) of the corpus of users is included. This selection may be further restricted to only include the most common paths within quests that the user currently has open or has completed one or more events on.

Such an approach is likely to exclude some of the statistical outliers that may make an estimate based on the full available corpus unreliable.

Optionally one or both of these estimates may be provided; where both are provided, they may represent a likely range of times for the current player, in their current in-game state, to complete the task. As noted previously, the respective sub-groups in the corpora used for these estimates may be refined again based on comparative historical speed/proficiency to compare the current user with more similar members of the corpora, to further improve the estimate.

In either case, in an embodiment of the present invention the current state of the user may be taken to correspond to their most recently completed task.

Hence as noted above, rather than predicting the time taken to complete a task from start to finish, in an embodiment of the present invention what is predicted is the time taken from the completion of one task to the completion of another task.

Figure 4:
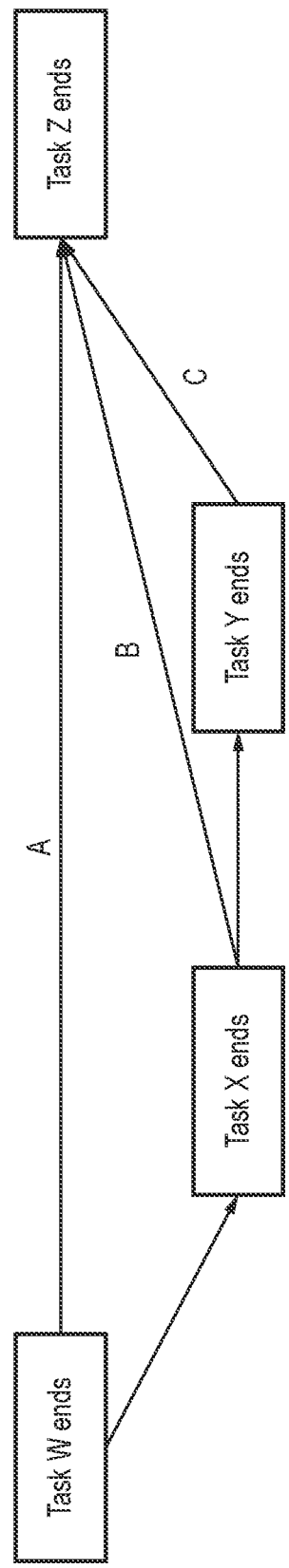
FIG. 4 is a schematic diagram of focused and distracted approaches to task completion in accordance with embodiments of the present description.

An example is given with reference to FIG. 4. Instead of using a single corpus of all players who completed task Z, a respective sub-corpus of players is selected who transitioned from ending one of tasks, W, X and Y to ending task Z. The sub-corpus chosen will then depend on whether the current player for whom a time for completing task Z is being estimated has just completed task W, X or Y.

It will be appreciated that the completion time for each of paths A, B and C will have different means and variances, but that typically each of these will provide a more accurate estimate for a current user at respective task ending state W, X or Y than an all-corpus estimate of task completion.

In effect, the approach is to derive the focused sub-group of users who transitioned from the user's current state (whether W, X or Y) to the desired end state (Z), as described previously.

It will also be appreciated that there is further scope for improvement; for example, after completion of task X, some people proceed would not take the focused route but will finish task Y before finishing task Z via route C; hence a time estimate based on direct path B may be optimistic.

In this case, one may sum the times for a transition from task X ending to Task Y ending, and then from task Y ending to task Z ending. Then the focused (path B) and distracted (summed) paths could be averaged together weighted by the number of people in the corpus who took these respective paths.

It will be appreciated that this is a specific case of identifying the N % of uses in the corpus who have taken the most common paths, as described previously.

Similarly, more subtasks could be added, increasing the granularity of measured progress of players; this would improve the model, albeit at the cost of additional storage and processing overheads.

Hence in the present method each prior task is treated as a corpus, and using that corpus, it is then determined how long a player will likely take in completing a given next desired task. So, if within the corpus there are players who have transitioned from A to B; A to C to B; or A to D to B, and it is known that the prior task the user completed was C, then it is possible to generate a specific estimate for completing task B based on that subset of the corpus, which might be different than if the prior completed task was task D (or indeed A).

To illustrate the process, a specific example may be given with reference to the game 'Horizon Zero Dawn' (hereafter referred to as HZD). In this game, the first main quest that the player (as game protagonist 'Aloy') completes is called 'The point of the spear'. During this quest, players have the option of completing two side quests as well as an errand. These are summarised below, referencing the quest name used in the game, and an internal reference and abbreviation used herein:

"Main Quest: The Point of the Spear"—Main Quest #3—MQ3
"Side Quest: The Forgotten"—The Missing Outcast—TMO
"Errand: Odd Grata"—Help the Outcast—HTO
"Side Quest: In Her Mother's Footsteps"—The One That Got Away—TOTGA The above-described 'prior finished task' approach to defining a user's state means that there are a finite (though potentially large) set of routes taken by players between completions whilst completing the main quest.

Each completion route represents a subset of the corpus of all players who took the route between two completions (for example, between TMO and HTO). Put another way, each completion route can be considered to have its own corpus of players.

However, it should be appreciated that in an open world game, many of these quests and errands do not have dependencies upon each other; hence for example, it may be possible to start but not complete each of TMO, HTO and TOTGA prior to completing MQ3.

Hence as discussed previously, optionally tasks are broken down into sub-tasks, enabling progress through a task to be tracked. Hence more generally 'prior finished task' means any sub-task or event that is monitored for the purpose of constructing completion routes.

Hence there may be routes to completion of the main quest (or any event within it) from many events within other quests, resulting in a potentially exponential increase in possible routes. Hence expanding MQ3, TMO, HTO and TOTGA to include their subtasks (e.g., completing events such as dialogues or interactions with certain characters, reaching certain locations or collecting certain items), makes for a more complex set of completion routes, as illustrated in FIG. 5.

Figure 5:
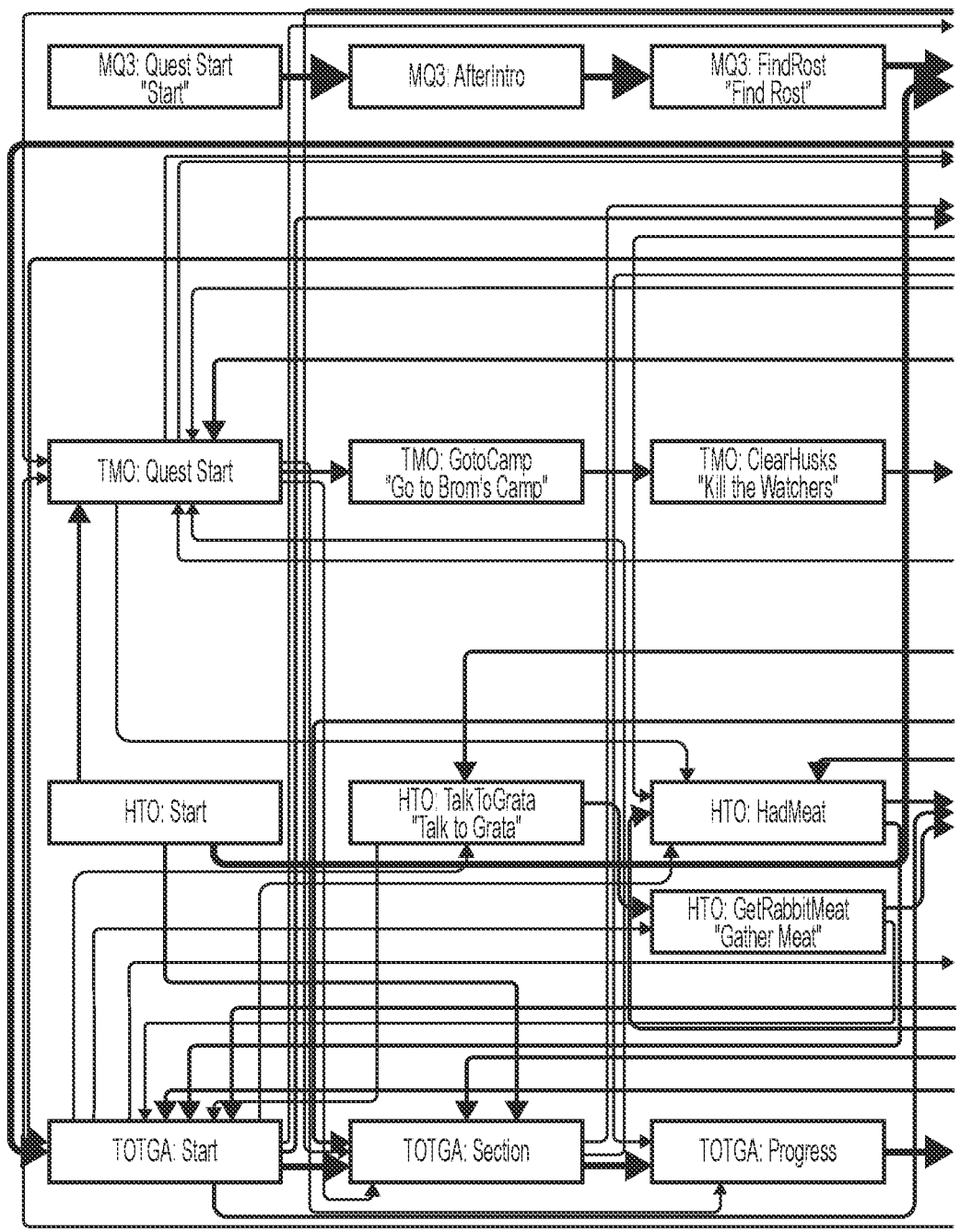
FIG. 5 is a task interaction map for part of a videogame in accordance with embodiments of the present description.
Figure 5:
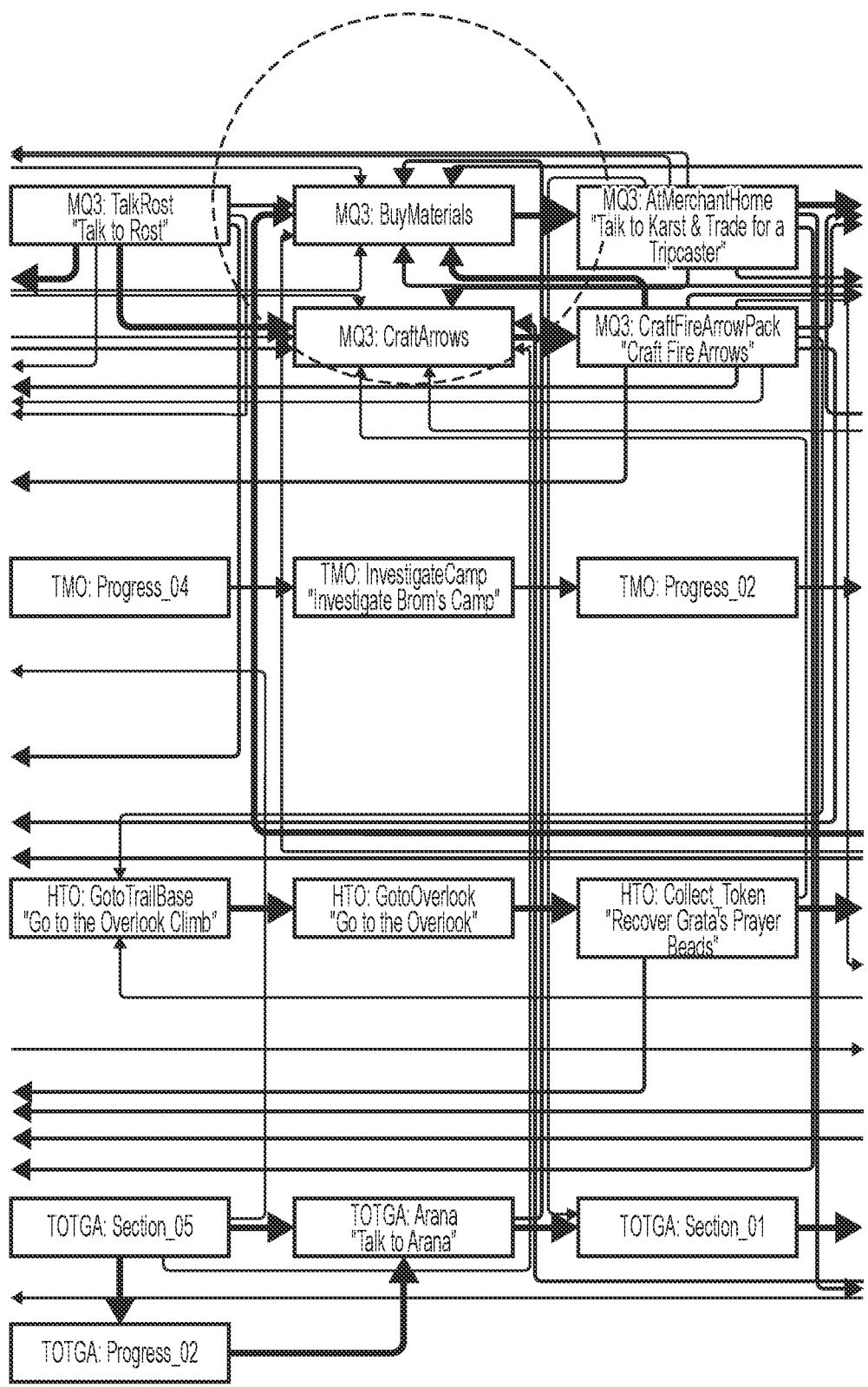
Figure 5:
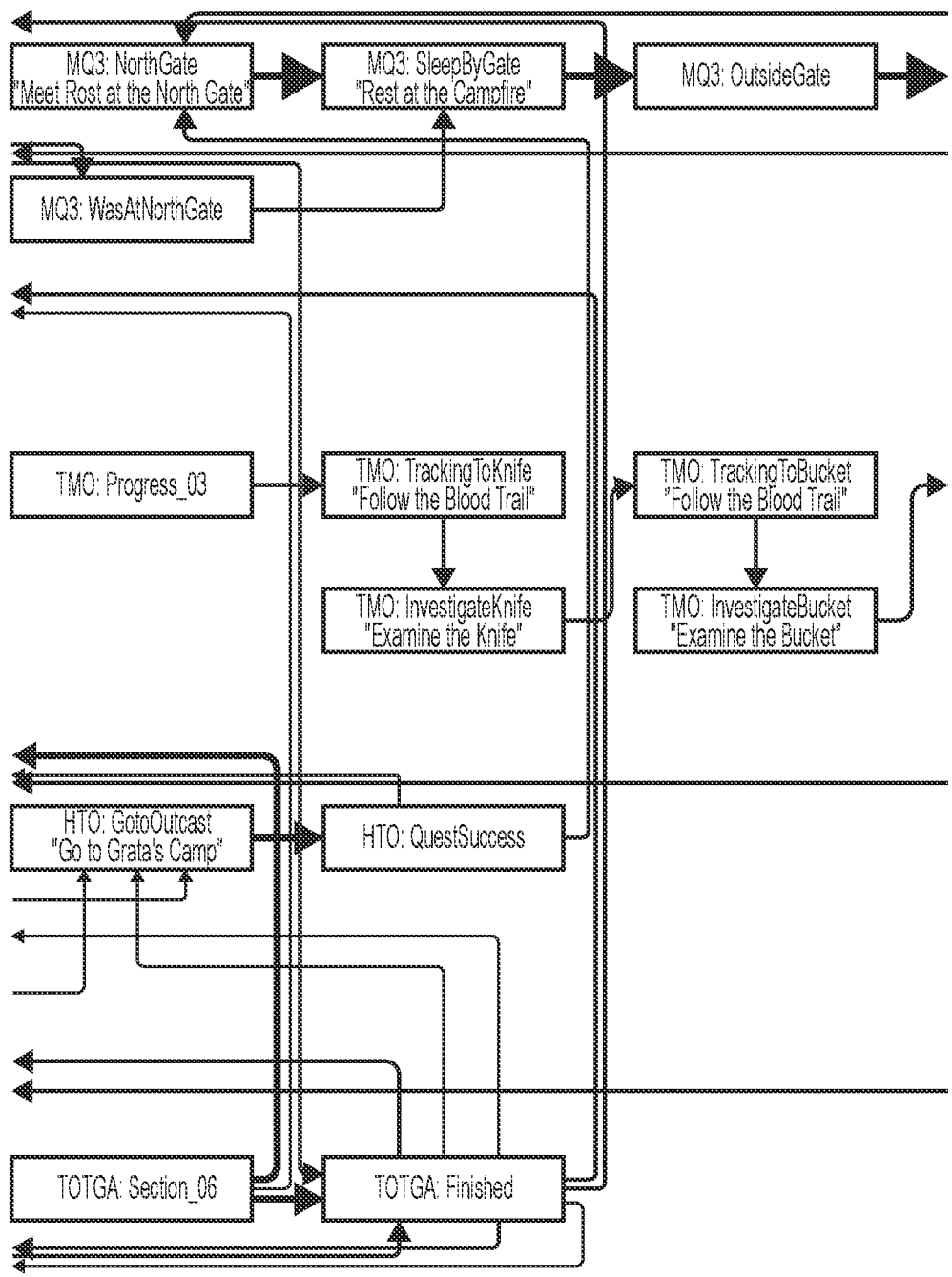
Figure 5:
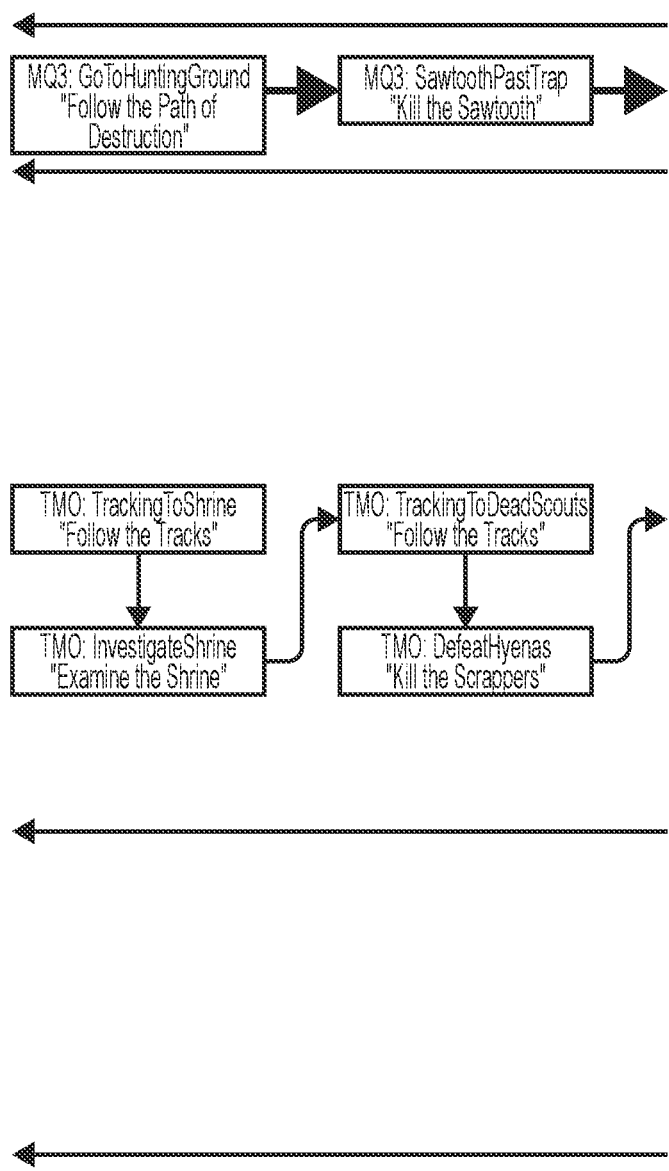
Figure 5:
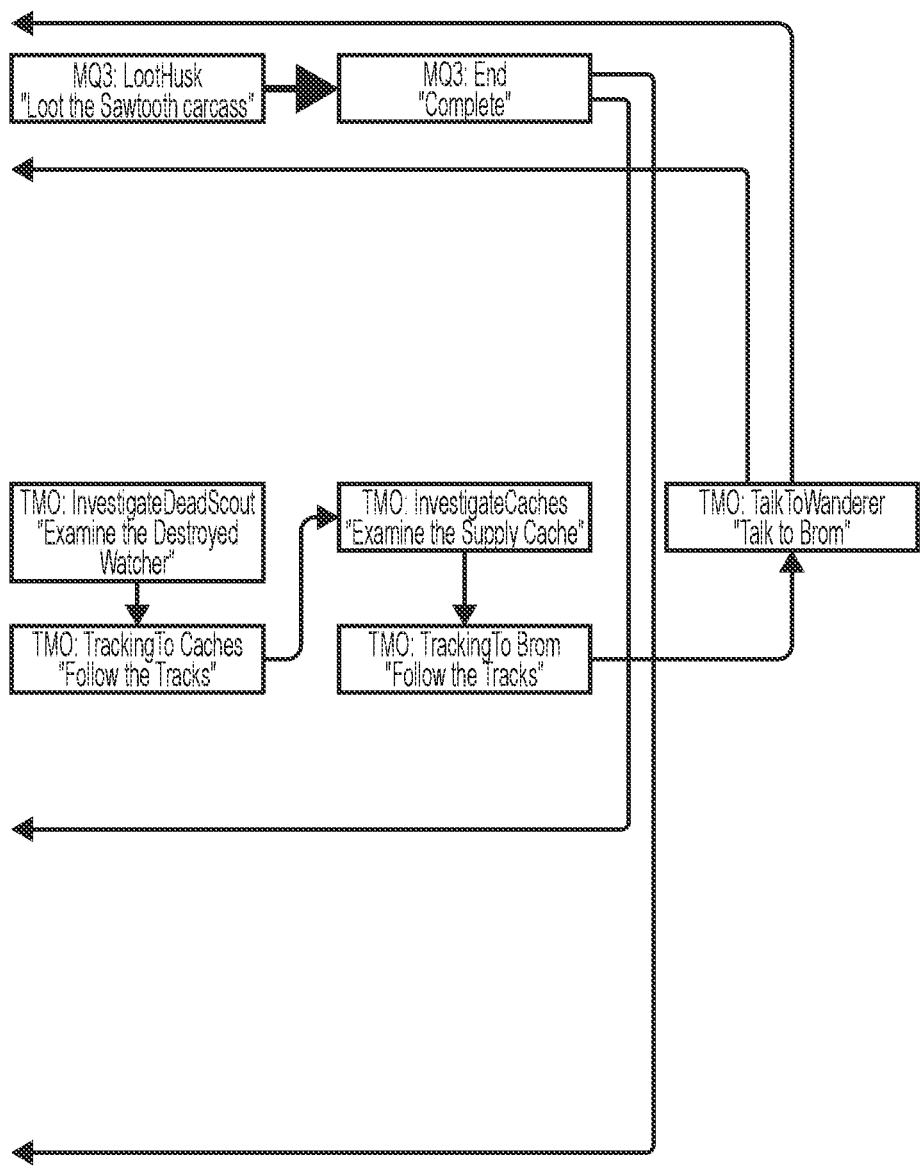

In FIG. 5, each of the four quests/errands are arranged horizontally. Notably it is not intended or necessary for the text in FIG. 5 to be legible; the Figure merely illustrates how the number of completion routes can expand dramatically as more events within a larger quest are tracked.

In FIG. 5, one event from the main quest has been highlighted, which may be referred to as MQ3: Buy Materials (referred to in the game as 'Buy materials from Karst').

Figure 6:
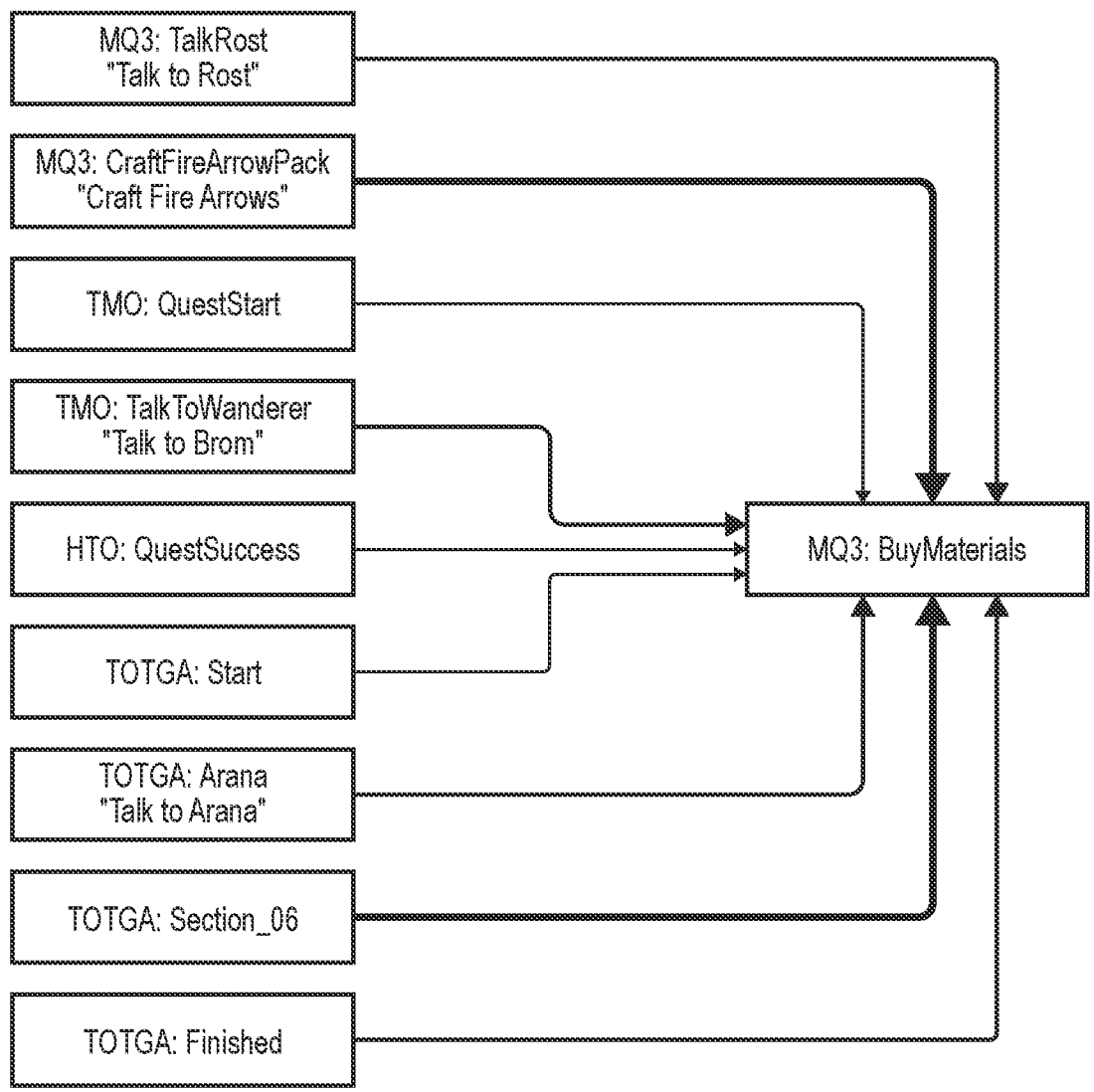
FIG. 6 is a task interaction map for part of a videogame in accordance with embodiments of the present description.

The most common completion routes between preceding events and the completion of this task in particular are then shown in FIG. 6. The sub-set of the corpora for each route will then form the basis for a respective estimation of the time for that route.

The relative size of corpora for each route is approximately reflected by the size of the connecting arrow. It will be appreciated that some routes are more common than others; in particular, the route from MQ3 'Craft Fire Arrows' is common because users find that they need additional materials to craft the arrows. Meanwhile TOGA: Section_06 may be common due to geographical proximity in-game. Corpora sizes are discussed further later herein.

TABLE 1

'Prior task' completion times from events shown in FIG. 6 to the completion of the event 'Buy Tripcaster from Karst.

| Prior Task completions before "Buy Tripcaster from Karst" | % of Players | "Basic Mean" Competion Time | "Prior Task" Mean Completion Time |
|---|---|---|---|
| MO3: CraftFireArrowPack-"Point of the Spear: Craft Arrows" | 41% | 41.3 mins | 6.0 mins |
| TOTGA: Section_06-"In Her Mother's Footsteps: XXXXXX" | 18% | 41.3 mins | 5.2 mins |
| TOTGA: Finished-"In Her Mother's Footsteps: Complete" | 11% | 41.3 mins | 8.3 mins |
| MO3: TalkPost-"Point of the Spear: Talk to Ross" | 7% | 41.3 mins | 14.8 mins |
| TMO: TalkToWander-"The Forgotten: Talk to Brown" | 7% | 41.3 mins | 6.6 mins |
| TOTGA: Arans-"In Her Mother's Footsteps: Talk to Arana" | 5% | 41.3 mins | 5.4 mins |
| HTO: QuestSuccess-"Odd Grata: Complete" | 3% | 41.3 mins | 9.5 mins |
| TOTGA: Start-"In Her Mother's Footsteps: Start" | 2% | 41.3 mins | 8.8 mins |
| TMO: QuestStart-"The Forgotten: Start" | 2% | 41.3 mins | 10.7 mins |
| Other (59 Tasks) | 4% | 41.3 mins | |

The differences in timing between each of these routes (as seen in the righthand column) may be due to the relative in-game distances between where the respective events and 'Buy materials from Karst' occur, as well as any other factors such as obstacles or environmental hazards in between, or whether the completion of an event typically triggers a user to use an inventory or skill tree, or consult an in-game map, or watch a cut-scene.

Looking at the 'The point of the Spear' quest as a whole (for example when a user is deciding whether to start the quest with a view to completing it in a given time), then using the previously discussed approach of a basic estimate of all completion times from the start of the MQ3 quest to this point (in effect from the event 'MQ3: Talk to Rost' to 'MQ3: Buy Materials' via any route) gives an estimated completion time of 41.3 minutes.

This is a long time for a relatively simple task and is due to 93% of players completing some or all of the other previously listed quests/errands in between. Hence in this case most players are 'distracted' to a greater or lesser extent.

Meanwhile focused completions, which progress directly from 'MQ3: Talk to Rost' to 'MQ3: Buy Materials', take only 14.8 minutes. However, the focused players only represent 7% of all players; hence whilst the estimate is accurate for focused players, it may not be so accurate for a typical player.

However, it may be possible to improve the result further for a given current player who is seeking an estimate.

To a first approximation, it may be assumed that if a user chooses to select an interface option that provides such timing information, then they are seeking to play in a focused manner because they are time conscious. Similarly, the fastest time estimate can be provided with the caveat that it relates to playing the quest in a focused manner.

To another approximation, referring back to the previous discussion of comparing historical speed/proficiency within the corpus and for the current player, it may be possible to predict how focused the current player is likely to be on the current task. If the player is identified as being within a threshold % of the fastest quest completion times for N preceding quests, then the 'focused' estimate may be provided.

Where it is either not assumed that the user is focused, or the user's history does not suggest they are focused, then to another approximation, as noted previously the N % most common routes from the start of the quest (or alternatively the user's last completed task) to completion of the quest may be evaluated, and the average times for each in turn averaged, for example weighted by the number of users in each respective route corpus, to provide a most likely time for a typical user. In the above example, it may be that the (for example 25%) most common overall routes comprise the following:

one route that reaches MQ3: Craft Fire Arrows in an average of 12 minutes (not shown in table 1), before going on to MQ3: Buy Materials in an average of 6 minutes (as per table 1) taking an average of 18 minutes in total and representing 10% of all players, as the most common overall route;

the 7% of players who take the direct route in an average of 14.8 minutes (as per the table above);

6% of players who reach section 6 of TOTGA in an average of 17 minutes (not shown) and then take only a further average of 5.2 minutes (as per table 1) to complete MQ3: Buy Materials due to their proximity to the character 'Karst' at that point in the TOTGA quest; and 5% of players who complete TOTGA in an average of 22 minutes (not shown) and then take a further average of 8.3 minutes (as per table 1) to complete MQ3: Buy Materials.

In this case the fourth route takes the total over the required 25% threshold (a total of 27%). The estimated time may then be taken as (10×18)+(7×14.8)+(6×22.2)+(5×30.3), all divided by 27, to give an estimate of 21 minutes to complete the whole task whilst incorporating the most common distraction(s).

In any of these cases, if relevant then the fastest completion time from the last completed event of the player to a completion of the starting event of the new quest may be added, to account for any travel or preparatory actions needed to be taken prior to commencing the quest.

Hence more generally, in one embodiment an approach is to select at least the N % of users who take the most common paths (defined by the completion of tasks) between the completion of one task and the completion of another task.

When predicting a single point-to-point 'focused' path, this devolves to 100% of users who take that specific path; in that case the corpus is likely to provide an accurate estimate of completion. Each individual entry in table 1 represents such a focused path between the individual entry and completion of the 'MQ3: Buy Materials' task. These are equivalent to paths A and B in FIG. 4.

This allows the system to provide more accurate predictions of completion times for the user when it can be assumed that the user is 'co-operative' in acting in a focused manner and will proceed to finish the assumed task as their next action.

However, for distracted users, and/or for predictions where the focused path represents the approach used by less than N % of the corpus of users, then the most common paths may be considered as described previously to provide a likely estimate of time to completion of the desired task.

Using this approach, it is possible to build a data set of direct links between completed tasks within the game, each link specifying a number of users who took that link (either as an absolute or normalised value) and the average time taken for those users to transition directly between the completion of these tasks. As new users perform this transition, the number of users and the average can be updated accordingly. If other or more sophisticated statistical analyses are desired (for example relating to demographics or user performance), then the raw data of individual user times may be stored.

From these timings for individual transitions between task completions, the direct (focused) transition between the completion of any two tasks can be identified (if it exists—there will be many tasks where such transitions do not exist, for example due to the necessity to complete an intervening task such as travelling to a certain area or acquiring a quest-critical item).

However similarly, from these timings for individual transitions between task completions, the most common transition sequences from one completed task (corresponding to the user's current state) and the completion of a target task can be determined, for N % of the corpus population.

As noted previously, the corpus population from which this N % is chosen can itself be filtered, for example to mirror the user's demographics (one or more of age, gender, time within game, and the like) or ability (one or more of current character level, comparative speed or proficiency with respect to other players within the corpus, and the like). It will be appreciated that any such initial filtering of the corpus in this way may result in the most common transition sequences of N % of differently filtered corpus being different, and so more accurately predicting the overall expected time to completion of the desired task for a user who would be a member of that filtered corpus.

Optionally, an average time for the transition from completion of one task to another may only be generated once a statistically significant number of users have transitioned between the completion of two tasks. Generally, this will not be a problem for structured tasks, which will have a high volume of users follow a small number of paths to completion (even with some distractions). However, there are other types of task that are sparsely located in the game and/or not narratively or otherwise game driven that may not easily generate a statistically significant number of transitions. An example of such unstructured task sequences are finding trophy objects within the game world to form a collectible group. These may be a number of objects that, when all collected, provide a power-up, or some other reward or trophy, but whose collection or completion are not critical to the progression of the game or a quest. Furthermore, these objects of events are often hidden, or may only be found when on another quest. Hence direct transitions between these task completions may be rare, and even paths through multiple other task completions may be relatively random.

Referring now to FIG. 7, however, direct routes between such objects may still be determined using the techniques described herein. Furthermore, when a user enquires about the time needed to acquire some or all of such a collectible group, it may be accepted that the user intends to be focused in their play to achieve that goal. Hence whilst there may be many thousands of possible routes between all the collectible items, the fastest route can be readily determined, and the completion time estimated.

Hence FIG. 7 shows the number of users who transitioned directly from collecting one of ten collectibles in a group ('MK 1 Metal Flowers') to another within HZD. If one required at least 1,000 records (as a non-limiting example) for the data for a transition to be statistically significant, then the data for 85 out of 90 paths was usable within 1 month of the game's launch. Since the remaining paths were, by definition, rarely taken (from MF 06 to any of MF 05 to MF 10), these 85 paths represented the choices of 99.91% of players.

In this way, for any given metal flower just collected, a prediction could be made for how long it would take a focused player to collect another (whether the next in a series, or the closest, or according to any other criterion). Similarly, if the user had collected 4 of the metal flowers so far, the shortest time taken to collect the other 6 could be estimated by summing the times associated with the successive transitions.

Similarly, the most common route, and/or the most common routes taken by N % of the corpus can be determined and the completion time for the aggregate transition from collecting one metal flower to another can be estimated. Again, similarly the time needed to collect all the remaining metal flowers could be estimated in this way. However, due to the lack of narrative impetus between collections, there is likely to be greater divergence in completion times between routes for these sorts of tasks. Hence it may be preferable to provide the focused (direct) time estimate and clarify that this estimate is based on the assumption of focused play.

The techniques described herein assist a user by determining what tasks might be completed in a given time available to the user to play, and then presenting those tasks to the user.

The selection of such tasks for presentation to the user may be responsive to several factors. One factor is how closely to the estimated task completion time coincides with the available time. It is preferable that it is close but shorter, so that it can occupy the user's time whilst being achievable. It is also preferable that there is a reasonable chance of success for the user, and so optionally the estimated task completion time may choose a time corresponding to a fractional standard deviation of the distribution of times beyond the prediction (e.g. the average); hence for two different example transitions the predicted average time may each be 10 minutes, but in one case the time for +0.3 standard deviations from the average of users is 12 minutes, but for another transition the time for +0.3 SD of users is 17 minutes. If the user has 15 minutes available to play, then the first example transition may be preferable to the second, and so may be listed first (or the second example transition may be excluded from the list or weighted against in the list and ranked lower).

Where sub-tasks and minor events are included as tasks to improve the granularity of the model of transitions within the game, it becomes more likely that completion of such a minor task will coincide with the user's available time.

Hence a priority or seniority of task may be encoded, such that quest endings have the highest priority or seniority, whist other tasks such as collecting useful objects, or reaching a cut scene or useful dialog may have a lower priority. Some tasks then may have a lower priority still.

This priority/seniority may then be used in ranking results, either filtering by priority/seniority, or weighting the position of tasks in a suggestion list according to priority/seniority, in conjunction with other factors such as similarity of completion time to available time, as described previously.

In variant embodiments, the above techniques can alternatively or in addition be used as follows.

For a given available period of time, the system can predict how many tasks in the current game the user will complete (for example N tasks, or M % of a current open quest). This prediction can be limited to accounting for high priority or high significance tasks (e.g., tasks or steps in a quest that the user would otherwise be notified about in normal play, and/or save points, or similar). In this way, rather than receiving an indication of what tasks or goals are achievable within the available time or being spawned into the commencement of such a task or goal, then alternatively or in addition the user can be informed of how much of a nominated task or goal can likely be achieved in the available time. This may enable the user to make an informed choice about whether to play their intended quest, for example. This approach can be achieved for example by evaluating candidate tasks in a known sequence within a quest from the user's start point to identify which has a calculated representative time to completion closest to the available period of time.

Similarly for a game with fixed save point locations, during play the system may prompt the user to be more focused in completing the task of reaching that location (or provide hints/guidance towards it) if the techniques described herein predict that the user will not reach the save point location in the remaining available time—which can result either in progress not being saved, or the user having to play longer than planned (which may impact upon other aspects of the player's schedule). Again, this may be achieved by setting completion of reaching of the save point location (or saving the game at that point) as the target task, and based on the user's current start point, comparing the resulting calculated representative time to completion with the available time remaining. If the calculated representative time to completion exceeds the remaining available time (optionally by a threshold amount), then the system can prompt the user to be more focused/direct or assist them to that effect for example by removing optional opponents enroute, or providing hints to an optimal route.

It will be appreciated that the tasks to be selected may not simply be tasks within an existing instance of a game; for example, to select a task based on its apparent suitability for fitting the user's preferred available time to play, the task and its associated assets (e.g., scene data, audio data, gameplay logic, and the like) may need to be loaded into the computer. Similarly, where the task is an on-line activity, such as for example choosing a particular multiplayer map and or style of play (e.g., team-based, cooperative or death match), then the selection may involve connecting the computer to an appropriate on-line service to fulfil provision of the task.

Hence more generally selection of an identified target task may involve loading and running and/or using new assets related to the task, and/or may involve connecting the computer to an appropriate on-line service, typically using a respective handshake or other communication protocol to inform the service of the nature of the task selected.

In the case of a multiplayer map and style of play, the task may relate to a goal within the multiplayer map and style of play, or may relate to survival within the multiplayer map for the style of play; in this case, the target task can be thought of as dying and becoming a spectator or other nonparticipant; for certain styles of play, such as a melee character class, there is a tendency to directly engage in combat in a more focused manner, as described elsewhere herein, and so progression to that task is relatively direct and the user's survival time tends to rely significantly on skill. Meanwhile for example for an engineer character class where the character lays traps or otherwise engages more indirectly with the combat, then the user may spend more time scouting around for good trap positions or the like, in which case their survival time may vary according to the topology of the map, what other map features are to be found, or how diligent they are with their scouting behaviour, and hence may be characterised as less or more distracted, as described elsewhere herein.

It will be appreciated that the above techniques have been described with reference to a computer game (videogame). However more generally the techniques can apply to any computer application in which sequences of tasks may occur, for example as part of progress towards an intended outcome. Similarly, the techniques are not limited to any one application, but may be implemented by a computer (for example the operating system of the computer) to predict representative completion times for target tasks that may span the operation of multiple applications or interactions with hardware (such as scanning, printing, loading, saving and the like), or indeed may be implemented by a supervisory computer for activities across multiple computers. An example may comprise the need to complete a task with office hours and predicting whether a user can complete the task in time. Conversely, if different users are historically more or less focused, the techniques described herein enable the selection of which user, within a corpus of users, to assign the task to in order to most likely have it completed within a target time.

Figure 8:
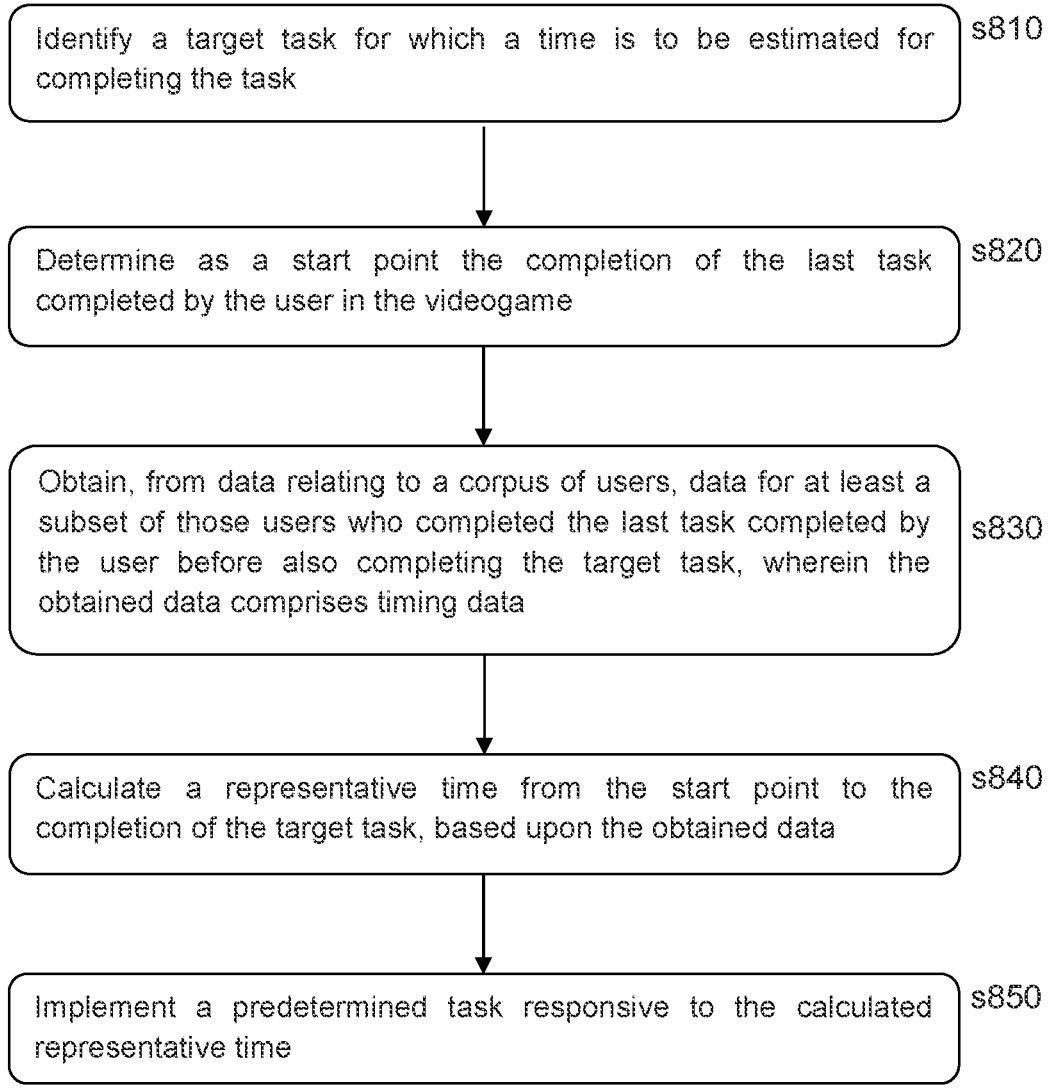
FIG. 8 is a flow diagram of a method of estimating a time to complete a task for a user of a computer, in accordance with embodiments of the present description.

Turning now to FIG. 8, in a summary embodiment of the present invention, a method of estimating a time to complete a task for a user of a computer comprises the following.

In a first step s810, identifying a target task for which a time is to be estimated for completing the task. As will be appreciated from the description herein, this task may be identified as being the next high priority or seniority task in a currently open or available quest, or may be a task highlighted by the user via a user interface, or may be a task selected by an algorithm on the entertainment device or indicated by a central server (for example as a 'challenge of the day'), or may be a task comprising a minimum of N intermediate tasks to complete (where N is any integer value from 0 upwards), so that task sequences of varying complexity can be selected.

In a second step s820, determining as a start point the completion of the last task completed by the user on the computer (for example in a videogame). As noted elsewhere herein, the described technique is based upon elapsed times between completions of pairs of tasks. Consequently, the start point of a time estimation is the completion of the last task completed by the user. As noted previously herein, the term 'task' may encompass one or more of a task subtask, quest, sub-quest, event, and any similar in-game action with a measurable completion or increment toward completion.

In a third step s830, obtaining, from data relating to a corpus of users, data for at least a subset of those users who completed the last task completed by the user before also completing the target task, wherein the obtained data comprises timing data. As noted elsewhere herein, the data relating to the corpus of users comprises timing data for elapsed times between completions of pairs of tasks.

Consequently, data for those users who completed the last task completed by the user before also completing the target task relates to users who, at some point during their play, completed these two respective tasks in the desired order (i.e., with the task completion at the start point preceding the completion of the target task).

Furthermore, reference at least a subset of those users reflects that different users in the corpus may have completed these two respective tasks for different routes and/or degrees of focus, as described elsewhere herein, and may be selectively chosen on this basis.

In a fourth step s840, calculating a representative time from the start point to the completion of the target task, based upon the obtained data. As noted elsewhere herein, is typically comprises determining an average or other statistically representative completion time based upon the completion times of the at least subset of users in the corpus from which data was obtained. Again, as noted elsewhere herein, this average may be based on a direct transition from completion of the start to target tasks, or the most direct available route via other tasks, or the most popular route via other tasks, or the most popular routes via other tasks that collectively account for a predetermined proportion of the corpus of users who completed the task starting task before the target task, as described previously.

In a fifth step s850, implementing a predetermined action responsive to the calculated representative time. Typically, this action will relate to indicating the calculated representative time to the user, and/or selecting or ranking a target task whose calculated representative time meets a predetermined timing criterion, such as a preferred gameplay period specified by user.

Alternative timing criteria include whether a higher priority event is scheduled by entertainment device, such as for example switching to a live event, or the impending end of an available gameplay session as determined by a parental control scheme, or an estimate of battery life for a controller of the entertainment device or the entertainment device itself that might effectively limit the available duration of gameplay.

It will be apparent to a person skilled in the art that variations in the above method corresponding to operation of the various embodiments of the method and/or apparatus as described and claimed herein are considered within the scope of the present disclosure, including but not limited to the following instances.

In an instance of the summary embodiment, the implemented task comprises indicating the representative time to the user, as described previously herein.

In an instance of the summary embodiment, the implemented task comprises setting the completion of the target task as a goal in a videogame, as described previously herein.

In an instance of the summary embodiment, the method also comprises the steps of obtaining a target completion time; calculating representative times for a plurality of candidate target tasks, based on respective subsets of users within the corpus; and identifying as the target task the candidate target task whose representative time best fits the target completion time.

Hence the process in steps s810 to s804 may be repeated for a plurality of candidate target tasks, and a further step is provided to compare these calculated representative times with the target completion time. As noted above, the target completion time can be based on user input or other criteria. Similarly, as noted above, the best fit to this time may include considerations of variance in the estimate, or any other suitable factors biasing a preference towards a small overestimation of completion time.

In an instance of the summary embodiment, a subset of those users who completed the last task completed by the user before also completing the target task comprises users who proceeded directly from completing the last task completed by the user to completing the target task. Referring back to FIG. 4, this may relate to users who took route A between the completion of tasks W and Z.

In an instance of the summary embodiment, a subset of those users who completed the last task completed by the user before also completing the target task comprises users who proceeded from completing the last task completed by the user to completing the target task via completion of the smallest number of intervening tasks. Referring back to FIG. 4, if route a did not exist, then this may relate to users who took route B (as opposed to route C) between the completion of tasks W and Z.

In an instance of the summary embodiment, a subset of those users who completed the last task completed by the user before also completing the target task comprises users who proceeded from completing the last task completed by the user to completing the target task via the most common sequence of intervening tasks. Referring back to FIG. 4, then empirically this may indicate that most users took route C between the completion of tasks W and Z, and so the subset comprises these users.

In an instance of the summary embodiment, a subset comprising at least a minimum threshold proportion of those users who completed the last task completed by the user before also completing the target task comprises successive subsets of users who proceeded from completing the last task completed by the user to completing the target task via successively most common sequences of intervening tasks. Referring back to FIG. 4, then empirically this may indicate that 20% of users took route C between the completion of tasks W and Z, followed by 15% taking route A, and then 10% taking route B; consequently to form a subset comprising a minimum threshold proportion of (by way of non-limiting example) 30% of all users who completed the starting and target tasks in that order, users who completed route C and also route A are included in the subset.

In an instance of the summary embodiment, either the corpus of users or the or each subset of users is filtered to form a sub-set responsive to an estimate of the user's capability. As noted previously herein, the user's apparent capability (for example speed or proficiency) can be estimated from the completion of previous tasks within the videogame, and/or may be obtained from similar measurements in other videogames, for example maintained as a capability score associated with the users' profile. Such a capability score can be compared against the capability scores of users in the corpus (typically their capability scores when their respective timing data was recorded) to determine a subset of the corpus of users who may be thought of as their peers. The above steps may then be carried out using this filtered corpus, for example either applying the filtering before step s830 or after step s830.

In an instance of the summary embodiment, the subset of those users who completed the last task completed by the user before also completing the target task is selected in response to a prediction of how likely the user is to complete the target task in a direct or indirect manner. As noted previously herein, alternatively or in addition to an estimate of the user capability, an estimate of the user's focus may be derived. Hence for example when selecting a quest, the number of intervening tasks that are not quest related may be determined and serve to indicate the degree to which the user focuses on the quest. It will be appreciated that the number may be accumulated over multiple quests or indeed multiple games and may for example be represented as a ratio of quest-based tasks to non-quest based tasks completed notionally during a quest. The number or ratio may also be subject awaiting depending on the nature of a completed task, with incidental tasks such as picking up a health pack that happens to be on the way to completion of a quest may have a fractional contribution less than one, whereas completion of a battle or spell requires gathering numerous resources may have a weighting greater than 1. In any event, such a number may for example be compared against a mean of corresponding numbers from users in the corpus to determine the user's relative degree of focus.

This may be used to determine whether the subset of users whose data is obtained relates to users who complete the task directly or by the quickest route or relates to users who complete the task by the most common route or routes, as described herein.

It may similarly be used like the capability value to filter the corpus of users to determine a subset who are similarly focused or distracted. The above steps may then be carried out using this filtered corpus, for example either applying the filtering before step s830 or after step s830.

In principle both capability and degree of focus could be used to filter the corpus in this manner.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

A suitable example of such hardware is the Sony® PlayStation 4 ® or PlayStation 5 ® entertainment device, operating under suitable software instruction, as described previously herein.

Hence accordingly, in a summary embodiment of the present invention, an apparatus 10 (such as the Sony® PlayStation 4 ® or PlayStation 5 ® entertainment device, or a server or the like) adapted to estimate a time to complete a task for a user of computer (for example within a videogame), comprises the following.

An identification processor (such as CPU 20A) adapted (for example by appropriate software instruction) to identify a target task for which a time is to be estimated for completing the task;

a determination processor (such as CPU 20A) adapted (for example by appropriate software instruction) to determine as a start point the completion of the last task completed by the user on the computer (for example in the videogame);

a data obtaining processor (such as CPU 20A) adapted (for example by appropriate software instruction) to obtain, from data relating to a corpus of users stored in a memory (such as RAM 22 or HDD 37, or fixed media such as an optical disc 36A, or via network addressable storage such as on a remote server), data for at least a subset of those users who completed the last task completed by the user before also completing the target task, wherein the obtained data comprises timing data; and a time calculation processor (such as CPU 20A) adapted (for example by appropriate software instruction) to calculate a representative time from the start point to the completion of the target task, based upon the obtained data.

Meanwhile, the apparatus is adapted (for example by appropriate software instruction) to implement a predetermined action responsive to the calculated representative time, as noted previously.

The apparatus may be further adapted (for example by appropriate software instruction) to implement any or all of the techniques described herein, including those of the instances of the summary method embodiment.

Hence for example the apparatus may comprise an input processor (such as CPU 20A in communication with an input such as a controller 43, a wired input port such as USB port 35, or a wireless input source via Ethernet®, Bluetooth®, or WiFi® ports 32, 33, 34), adapted (for example by appropriate software instruction) to obtain a target completion time; the previously described time calculation processor being adapted to calculate representative times for a plurality of candidate target tasks, based on respective subsets of users within the corpus; and a candidate evaluation processor (such as CPU 20A) adapted (for example by appropriate software instruction) to identify as the target task the candidate target task whose representative time best fits the target completion time.

Meanwhile for example when implementing the techniques herein, optionally the plurality of candidate target tasks represent a sequence of tasks that progress toward a goal, and the identified target task is indicative of how much of the goal a user is likely to complete within the obtained target completion time. Similarly, the target task might relate to saving a state of the game for future use, and the time calculation processor may adapt to compare the calculated representative time with a target completion time; then if the calculated representative time exceeds the target completion time the apparatus implements a predetermined action selected to assist the user to complete the target task more quickly.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of estimating a time to complete a task for a user of a computer, comprising using one or more processors to perform the operations of identifying a target task for which a time is to be estimated for completing the task;

determining as a start point the completion of a last task completed by the user on the computer;

obtaining, from data relating to a corpus of users, data for at least a subset of the corpus of users, the subset having completed the last task completed by the user and the target task, with the subset having completed the last task completed by the user prior to completing the target task, wherein the obtained data comprises timing data;

calculating, through numerical analysis by the one or more processors, a representative time from the start point to the completion of the target task, based upon the obtained data; and implementing a predetermined action responsive to the calculated representative time.

2. The method of claim 1, wherein implementing the predetermined action comprises indicating the representative time to the user.

3. The method of claim 1, wherein implementing the predetermined action comprises setting the completion of the target task as a goal in a videogame.

4. The method of claim 1, wherein the one or more processors further perform the operations of
obtaining a target completion time;
calculating representative times for a plurality of candidate target tasks, based on respective subsets of users within the corpus; and
identifying as the target task the candidate target task whose representative time best fits the target completion time.

5. The method of claim 1, wherein a subset of those users who completed the last task completed by the user before also completing the target task comprises users who proceeded directly from completing the last task completed by the user to completing the target task.

6. The method of claim 1, wherein a subset of those users who completed the last task completed by the user before also completing the target task comprises users who proceeded from completing the last task completed by the user to completing the target task via completion of the smallest number of intervening tasks.

7. The method of claim 1, wherein a subset of those users who completed the last task completed by the user before also completing the target task comprises users who proceeded from completing the last task completed by the user to completing the target task via the most common sequence of intervening tasks.

8. The method of claim 1, wherein a subset comprising at least a minimum threshold proportion of those users who completed the last task completed by the user before also completing the target task comprises successive subsets of users who proceeded from completing the last task completed by the user to completing the target task via successively most common sequences of intervening tasks.

9. The method of claim 1, wherein either the corpus of users or the or each subset of users is filtered to form a sub-set responsive to an estimate of the user's capability.

10. The method of claim 1, wherein the subset of those users who completed the last task completed by the user before also completing the target task is selected in response to a prediction of how likely the user is to complete the target task in a direct or indirect manner.

11. A non-transitory computer-readable medium having stored thereon a computer program comprising computer executable instructions adapted to cause a computer system to perform a method of estimating a time to complete a task for a user of a computer, the method comprising using one or more processors to perform the operations of
identifying a target task for which a time is to be estimated for completing the task;

determining as a start point the completion of a last task completed by the user on the computer;
obtaining, from data relating to a corpus of users, data for at least a subset of the corpus of users, the subset having completed the last task completed by the user and the target task, with the subset having completed the last task completed by the user prior to completing the target task,
wherein the obtained data comprises timing data;
calculating, through numerical analysis by the one or more processors, a representative time from the start point to the completion of the target task, based upon the obtained data; and
implementing a predetermined action responsive to the calculated representative time.

12. An apparatus for estimating a time to complete a task for a user of a computer, comprising:
an identification processor for identifying a target task for which a time is to be estimated for completing the task;
a determination processor for determining as a start point the completion of a last task completed by the user on the computer;
a data obtaining processor for obtaining, from data relating to a corpus of users stored in a memory, data for at least a subset of the corpus of users, the subset having completed the last task completed by the user and the target task, with the subset having completed the last task completed by the user prior to completing the target task,
wherein the obtained data comprises timing data;
a time calculation processor for calculating, through numerical analysis by the time calculation processor, a representative time from the start point to the completion of the target task, based upon the obtained data; and
wherein the apparatus implements a predetermined action responsive to the calculated representative time.

13. The apparatus of claim 12, further comprising:
an input processor for obtaining a target completion time;
the time calculation processor for calculating representative times for a plurality of candidate target tasks, based on respective subsets of users within the corpus; and
a candidate evaluation processor for identifying as the target task the candidate target task whose representative time best fits the target completion time.

14. The apparatus of claim 13, wherein
the plurality of candidate target tasks represent a sequence of tasks that progress toward a goal, and
the identified target task is indicative of how much of the goal a user is likely to complete within the obtained target completion time.

15. The apparatus of claim 12, wherein
the target task relates to saving a state of the game for future use; and
the time calculation processor compares the calculated representative time with a target completion time;
and if the calculated representative time exceeds the target completion time, then
the apparatus implements a predetermined action selected to assist the user to complete the target task more quickly.

* * * * *